United States Patent
Vago et al.

(10) Patent No.: US 12,492,927 B2
(45) Date of Patent: Dec. 9, 2025

(54) CAPACITIVE ELECTRICAL CONDUCTIVITY SENSOR INTEGRATED IN A WATER METER

(71) Applicant: Itron, Inc., Liberty Lake, WA (US)

(72) Inventors: Stephane Vago, Pont de L Isere (FR); Patrice Carre, Ecully (FR); Gregory Pastor, Massy (FR); Vincent Mosser, Le Plessis-Robinson (FR)

(73) Assignee: Itron International, LLC

( * ) Notice: Subject to any disclaimer, the term of this patent is extended or adjusted under 35 U.S.C. 154(b) by 210 days.

(21) Appl. No.: 17/993,809

(22) Filed: Nov. 23, 2022

(65) Prior Publication Data
US 2024/0167860 A1   May 23, 2024

(51) Int. Cl.
*G01F 1/64* (2006.01)
*G01F 1/66* (2022.01)
(Continued)

(52) U.S. Cl.
CPC .............. *G01F 1/64* (2013.01); *G01F 1/712* (2013.01)

(58) Field of Classification Search
CPC ........ G01F 23/2968; G01F 9/00; G01F 1/053; G01F 1/0755; G01F 1/26; G01F 1/48;
(Continued)

(56) References Cited

U.S. PATENT DOCUMENTS 6,232,786 B1   5/2001   Barnett
10,473,498 B2 * 11/2019  Momose ................ G01F 1/60
(Continued)

FOREIGN PATENT DOCUMENTS

CN   103630753 A   3/2014
CN   104089985 B   8/2016
(Continued)

OTHER PUBLICATIONS

Cantilina, Keiran, "The Development of a Novel Capacitive Water Conductivity Sensor" Published May 2018, 58 pages.
(Continued)

*Primary Examiner* — Andre J Allen
(74) *Attorney, Agent, or Firm* — Lee & Hayes, P.C.

(57) ABSTRACT

A capacitive electrical conductivity sensor is integrated into a water meter. The sensor is used to determine water conductivity, which may be used to determine water quality. A model of a capacitor, a flow of water, and a plastic conduit used to conduct the flow of water passing through a water meter is defined. The model may include a circuit having a constant phase element (CPE) connected to a resistor $R_b$ and a capacitor $C_b$ in parallel. An input signal may be applied to the actual capacitor (not the model) over a range of frequencies. Current flow associated with several frequencies may be used to identify values of $Q_0$ and alpha of the CPE of the model. A value for the resistor $R_b$ is identified using values obtained from measurements. A conductivity of the flow of water may be derived using input values comprising $R_b$, and the values of $Q_0$ and alpha of the CPE of the model.

19 Claims, 12 Drawing Sheets

(51) Int. Cl.
   *G01F 1/712* (2006.01)
   *G01N 27/08* (2006.01)
   *G01N 27/22* (2006.01)

(58) Field of Classification Search
   CPC ...... G01F 11/284; G01F 13/001; G01F 19/00; G01F 23/165; G01F 23/241; G01F 23/2967; G01F 23/30; G01F 25/12; G01F 3/065; G01F 3/08; G01F 3/18; G01F 3/24; G01F 1/005; G01F 1/106; G01F 1/37; G01F 1/375; G01F 11/28; G01F 15/001; G01F 23/0007; G01F 23/18; G01F 23/265; G01F 23/2966; G01F 23/80; G01F 3/04; G01F 3/06; G01F 3/26; G01F 1/07; G01F 1/11; G01F 1/1155; G01F 1/203; G01F 11/06; G01F 11/086; G01F 11/22; G01F 13/003; G01F 15/026; G01F 23/00; G01F 23/02; G01F 23/164; G01F 23/20; G01F 23/242; G01F 23/245; G01F 23/246; G01F 23/282; G01F 23/288; G01F 23/2928; G01F 23/64; G01F 23/72; G01F 23/802; G01F 25/0084; G01F 3/02; G01F 3/22; G01F 3/221; G01F 3/222; G01F 3/224; G01F 3/227; G01F 3/228; G01F 3/36; G01F 9/006; G01F 9/023; G01F 1/377; G01F 1/38; G01F 1/386; G01F 1/6886; G01F 1/6983; G01F 11/006; G01F 11/029; G01F 11/10; G01F 11/12; G01F 11/32; G01F 15/008; G01F 23/0046; G01F 23/04; G01F 23/168; G01F 23/247; G01F 23/2927; G01F 23/44; G01F 23/603; G01F 23/68; G01F 23/806; G01F 23/808; G01F 3/12; G01F 9/005
   USPC ............................................. 73/861–861.357
   See application file for complete search history.

(56) References Cited

U.S. PATENT DOCUMENTS

| | | |
|---|---|---|
| 2003/0010135 A1* | 1/2003 | Maxit .................. G01F 1/74 166/250.01 |
| 2005/0174123 A1 | 8/2005 | Ott |
| 2008/0296208 A1 | 12/2008 | Ikeyama |
| 2009/0315571 A1 | 12/2009 | Rajagopalan et al. |
| 2018/0052133 A1* | 2/2018 | Godfrey ................. G01N 27/08 |
| 2023/0384136 A1* | 11/2023 | Vago ..................... G01M 3/26 |

FOREIGN PATENT DOCUMENTS

| | | |
|---|---|---|
| CN | 207557158 U | 6/2018 |
| EP | 1677109 B1 | 7/2007 |
| JP | 4066772 B2 | 3/2008 |

OTHER PUBLICATIONS

Tejaswini, et al., "An Auto-Balancing Signal Conditioning Scheme for Non-contact Measurement of Conductivity of Water" Published in 2018 IEEE International Instrumentation and Measurement Technolocy Conference; 5 pages.

Extended European Search Report mailed Apr. 22, 2024 for European Application No. 23206647.2, a foreign counterpart to U.S. Appl. No. 17/993,809, 8 pages.

Office Action for Canadian Application No. 3,210,519, Dated Nov. 15, 2024, 6 pages.

Examination Report for Australian Application No. 2023233179, Dated Aug. 6, 2024, 3 pages.

Examination Report for Australian Application No. 2023233179, Dated May 22, 2025, 7 pages.

Li, "Electrochemical Impedance Spectroscopy of Tap Water", retreived on May 21, 2025, at <https://www.zhinst.com/others/en/blogs/electrochemical-impedance-spectroscopy-tap-water>, Zurich Instruments, Jan. 6, 2020, pp. 1-12.

\* cited by examiner

CAPACITIVE ELECTRICAL CONDUCTIVITY SENSOR INTEGRATED IN A WATER METER

BACKGROUND

Aspects of water quality are related to the electrical conductivity of water. Accordingly, new ideas for a water conductivity sensor adapted for use in a water meter would be welcome in the industry.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The design and operation of a capacitive electrical conductivity sensor integrated in a water meter are described herein. In one example, water conductivity is determined as part of a process that measures aspects of water quality. An example water meter may include a capacitor assembly, a flow of water, and an electrically insulating conduit used to conduct the flow of water passing through the water meter. Aspects of the capacitor assembly, the water and the plastic conduit are modeled. The model allows a measured complex admittance to be mapped to the model. Within the model, parameters are determined enabling the calculation of the conductivity of the flow of water. In one example, the model includes a circuit having a constant phase element (CPE) connected to a resistor $R_b$ and a capacitor assembled in parallel. The model may have an initial calibration and may include a geometrical factor (e.g., a factor based on aspects of the conduit, the flow of water, space between capacitor electrodes, etc.).

In example operation, inputs are introduced to the capacitor assembly and measurements are made, to thereby determine a complex admittance of the capacitor assembly. Mapped to the model, the complex admittance may be used to identify parameter(s) of the model, such as a value of the resistor $R_b$. The electrical conductivity of the waterflow may be calculated using the parameter(s) and an initial calibration of the model. The conductivity of the waterflow provides insight to aspects of water quality.

Example System and Techniques

Figure 1:
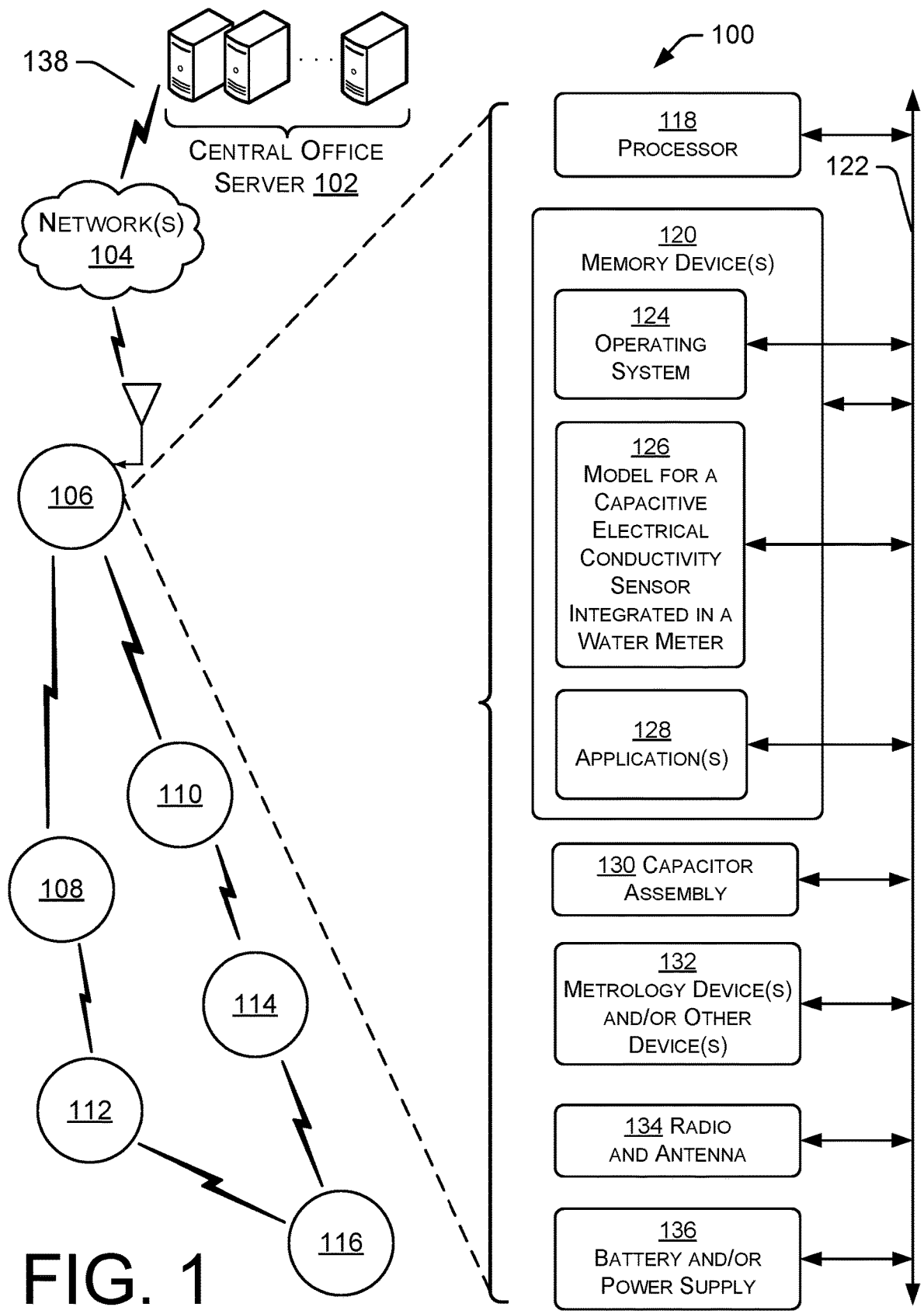
FIG. 1 is a block diagram showing a network of water meters, and showing example detail of a capacitive electrical conductivity sensor integrated with a water meter.

FIG. 1 shows a system 100 of water meters, network(s), and data-collection center(s). Example detail of one meter 106 is also shown, including a capacitive electrical conductivity sensor and associated model, which are integrated within the water meter. In the system 100, a central office server 102 is in communication over one or more network(s) 104. The network(s) 104 may be configured as one or more networks, such as the internet, cellular telephony, and/or proprietary radio frequency (RF) and/or wired networks. In an example, the water meters 106-116 may communicate using RF signals in a mesh or star network, thereby relaying information from meter to meter, and ultimately to a data collector (not shown) or the central office server 102. The data collector may utilize a cellular carrier and/or the internet to transmit the data to the central office server 102. While water meters 106-116 are shown, other nodes may include other types of devices known for use in a water-delivery system or water utility service. Example devices may include pumping stations, sensors, valves, etc. Other network communication and/or water utility service configurations can easily be formed based on design requirements.

Example structure of water meter 106 is shown. A processor 118 is in communication with one or more memory devices 120 over a bus 122 or other connecting assembly. The memory device(s) 120 may contain software and data, that may be executed and/or accessed by the processor 118. An operating system 124 may be configured to provide low-level tools or drivers usable by applications, and may contain tools to operate aspects of the metrology device(s) 132.

Figure 5:
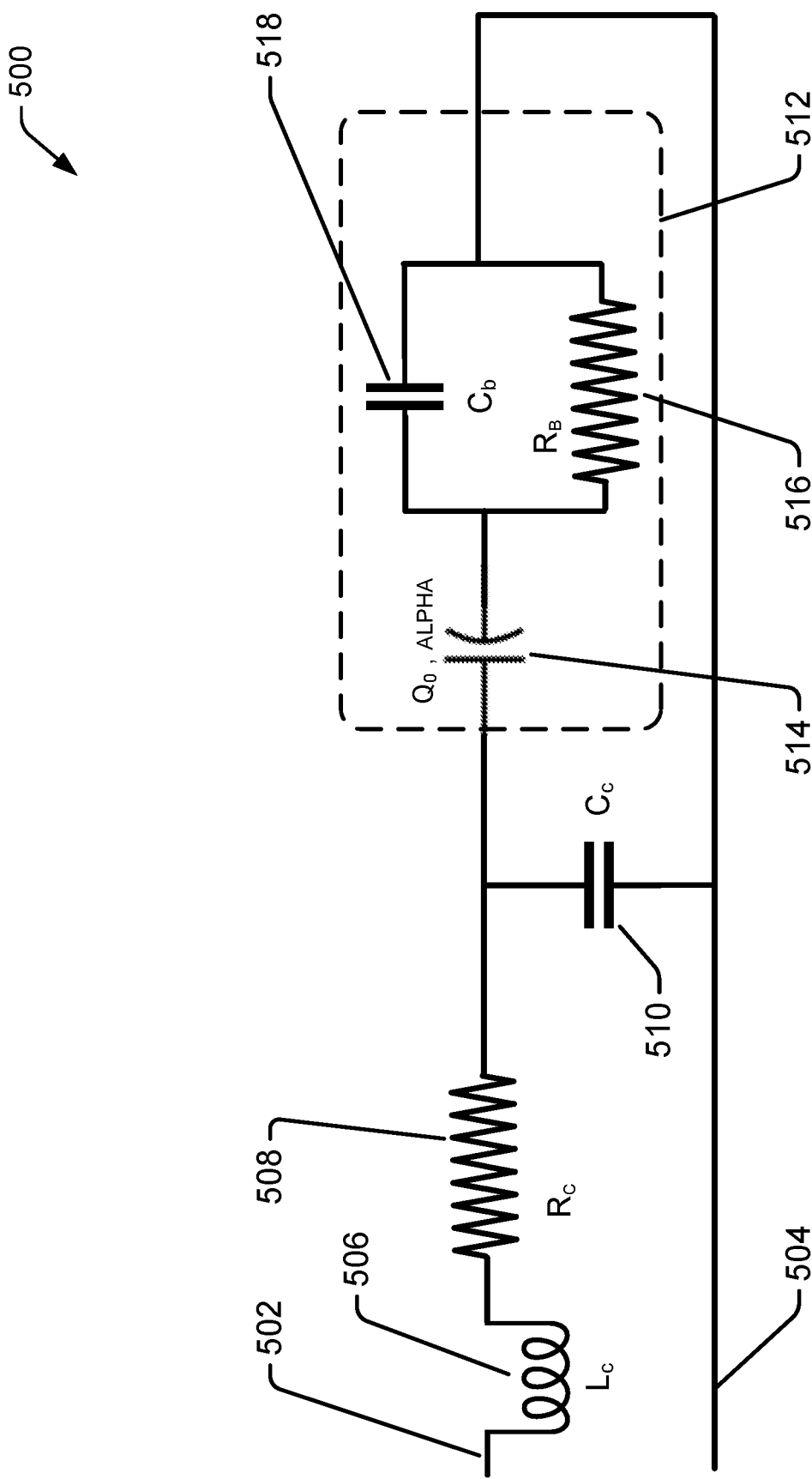
FIG. 5 is a circuit diagram showing an example model to be used in a process of determining the capacitance and/or complex admittance of a capacitor assembly, and subsequently determining a conductivity of water flowing through the water meter.

A model 126 for a capacitive electrical conductivity sensor integrated in a water meter may be configured as an application, part of an application, a data structure, or other software object. The model 126 may operate as a stand-alone program, or may comprise a data structure and/or algorithms that are operated in conjunction with one or more of the applications 128. While the model 126 is shown in generic form in FIG. 1, a specific example circuit 500 used to implement aspects of the model, is shown in FIG. 5. In an example, the model 126 describes aspects of a capacitor assembly, a flow of water, and a plastic conduit used to conduct the flow of water passing through a water meter. The model may be configured as a circuit having a constant phase element (CPE) connected to a resistor $R_b$ and a capacitor $C_b$ in parallel.

Applications 128 may include one or more software applications to operate the capacitor assembly 130, metrology devices 132, the radio and antenna 134, power supply 136, and/or other devices.

The capacitor assembly 130 is configured to include a medium between a first electrode and a second electrode including a flow of water (moving through the water meter). Based on at least part of a complex admittance of the capacitor assembly 130, a conductivity of the waterflow and aspects of water quality can be determined.

In example operation, an input is provided to the capacitor assembly. At least part (e.g., at least one of the complex part or the real part) of the complex admittance of the capacitor assembly is determined. The determined aspects of the complex admittance may be used in (and/or mapped to) a model to determine parameter(s) of the model, such as a value of the resistor $R_b$ (e.g., as seen in FIG. 5). This allows the conductivity of the flow of water to be determined. The conductivity can be used to determine various aspects of water quality in known manners.

Figure 3A:
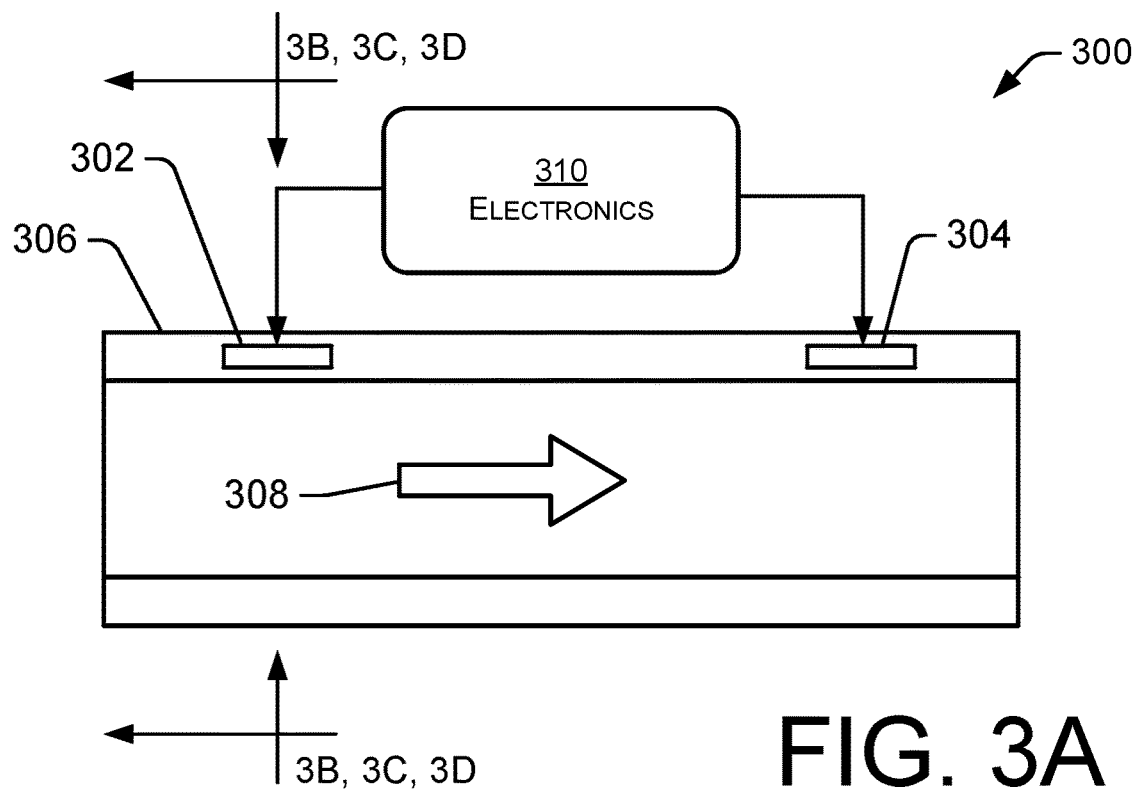
FIGS. 3A through 3D are diagrams showing four example designs for electrodes within a conduit of a water meter, with each design having a first electrode upstream of the second electrode.
Figure 3B:
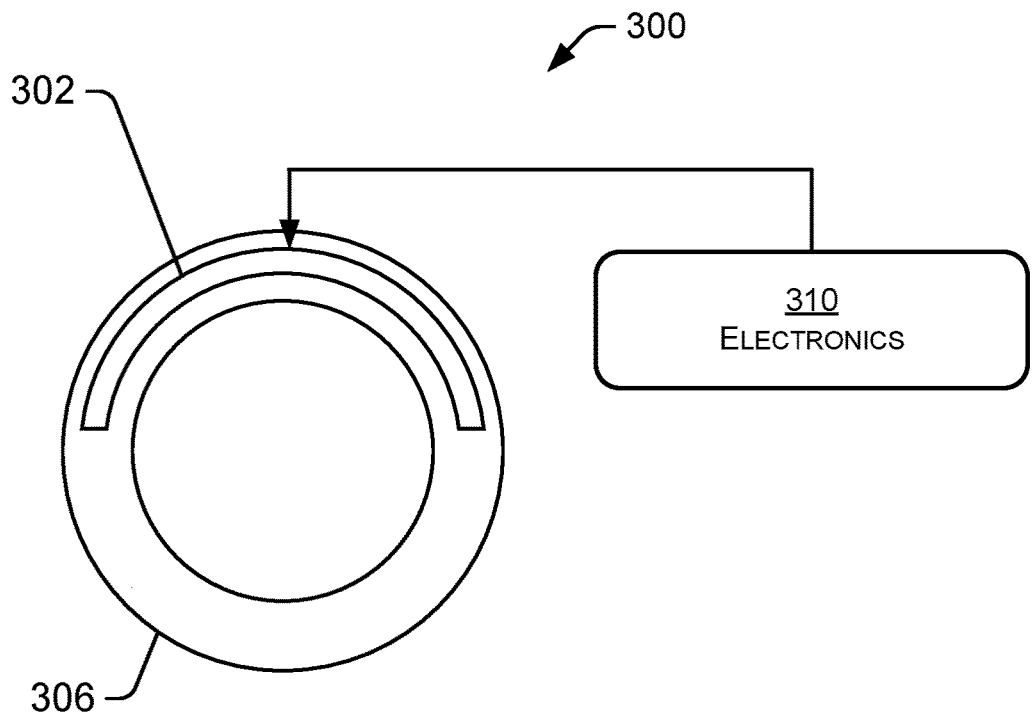
Figure 3C:
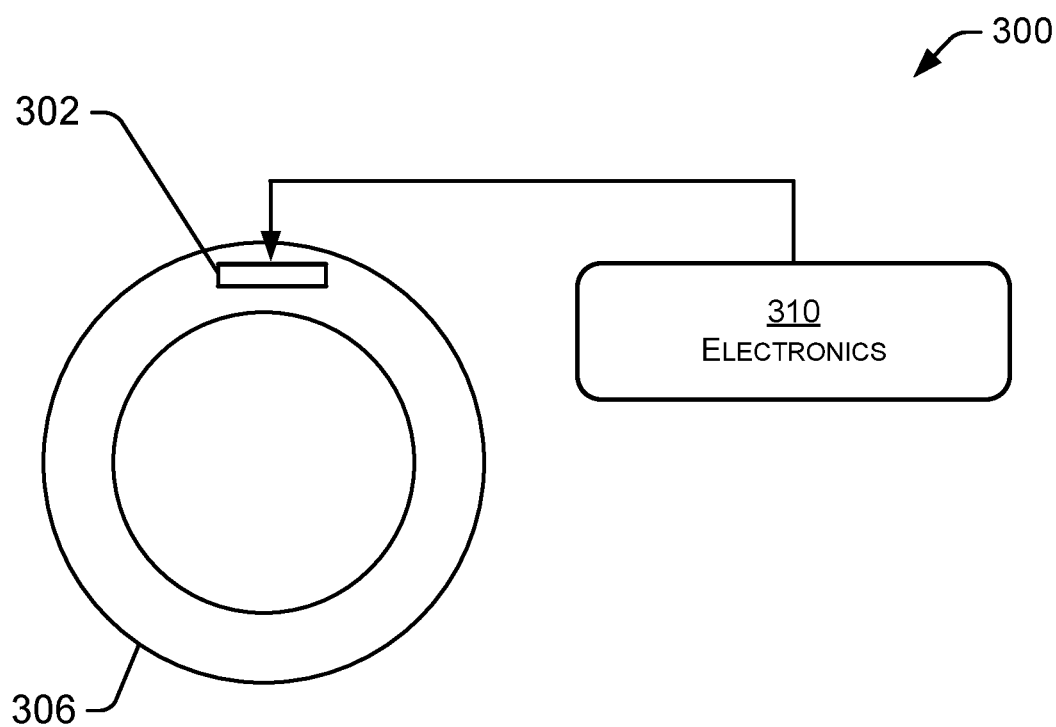
Figure 3D:
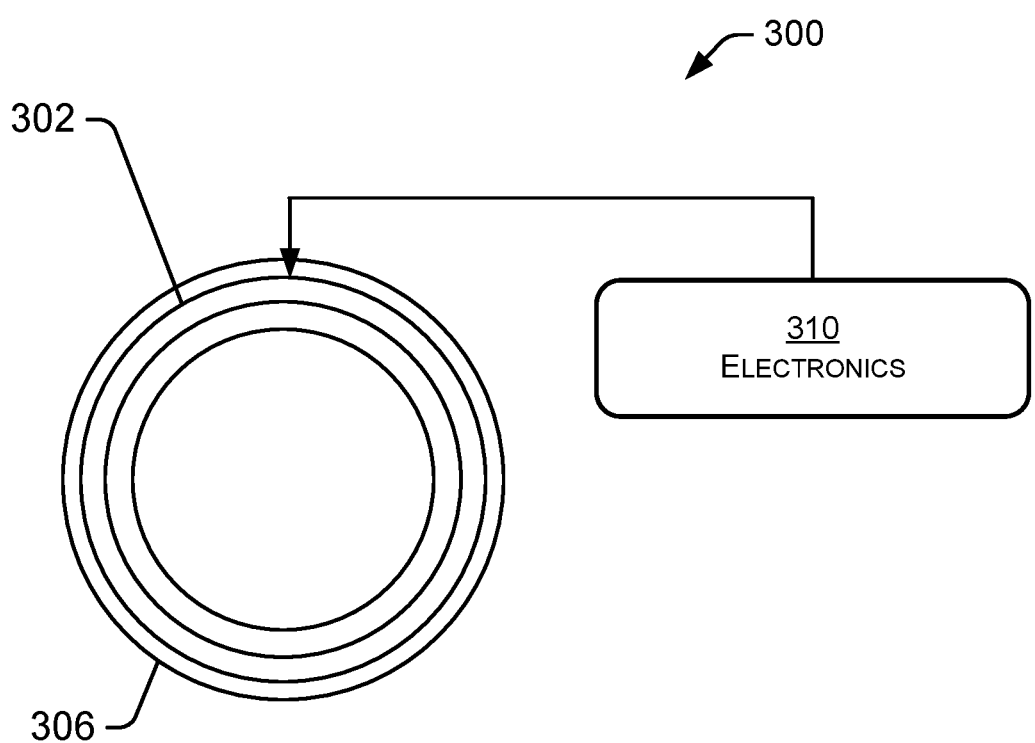
Figure 4:
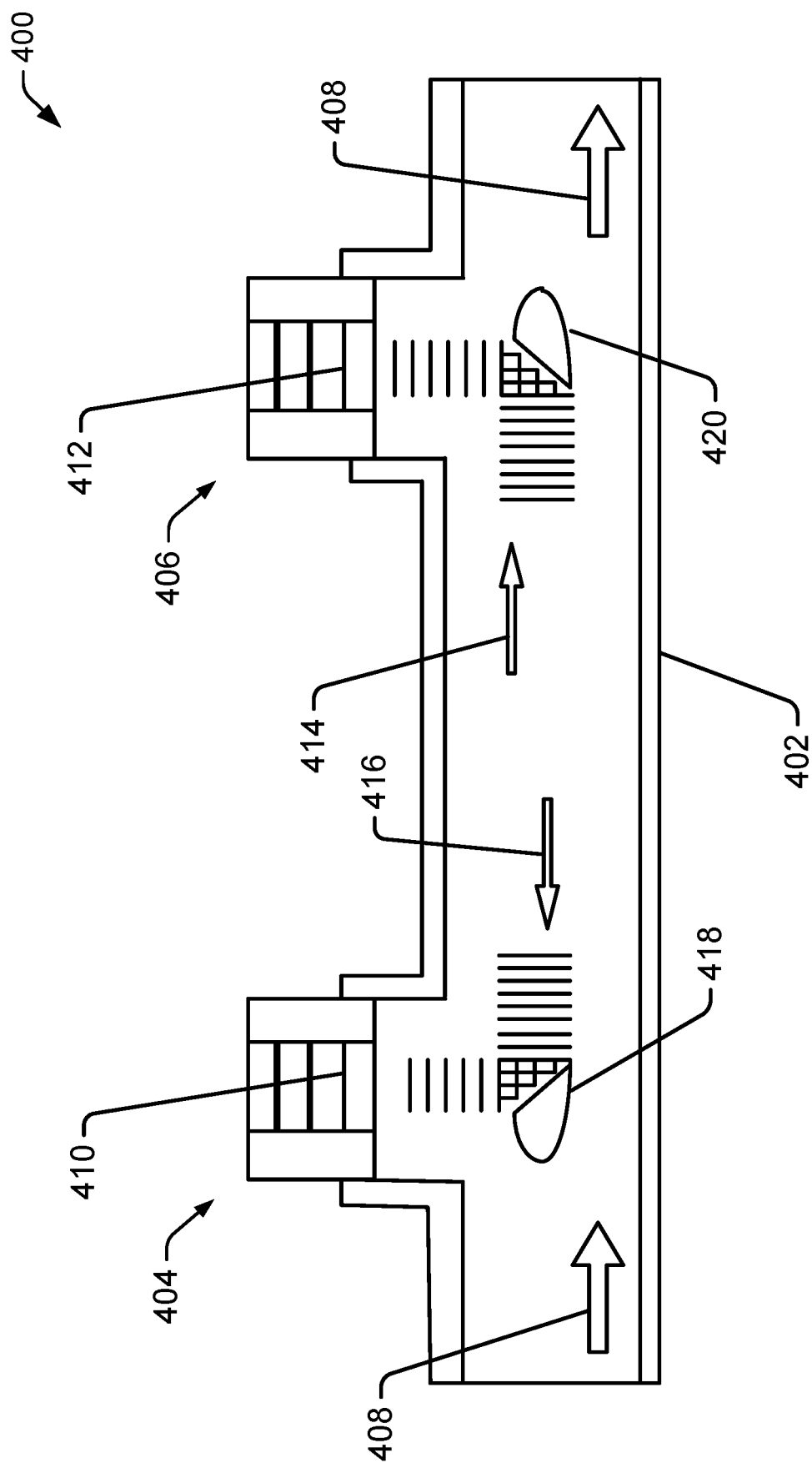
FIG. 4 is a diagram showing an example capacitive electrical conductivity sensor integrated in a water meter, wherein an upstream electrode and a downstream electrode are integrated with an upstream transducer and a downstream transducer, respectively.

Examples of the capacitor assembly 130 are seen in FIGS. 2 through 4. While not required, the examples of FIGS. 2 through 3 show first and second electrodes located within the plastic of a water pipe or conduit, and may be separated at least in part by the flow of water.

A metrology assembly 132 may be operated by the processor 118, such as by operation of an application from among the applications 128. The metrology assembly 132 may be configured to measure water flowrate and over time, water volume. In the example of FIG. 4, the metrology assembly 132 includes two transducers that send acoustic signals in opposite directions in the flow of water.

A radio and antenna 134 may be operated by the processor 118, such as by operation of an application from among the applications 128. The radio and antenna 134 may be in communication with one or more other metering devices within the system 100.

A battery and/or power supply 136 may be operated by the processor 118, such as by operation of an application from among the applications 128. The power supply provides voltage-regulated power to devices (e.g., the processor, metrology devices, etc.) within the water meter 106. In some examples, the processor 118 may alternate the power supply 136 between lower power-consumption and higher power-consumption modes of operation.

Figure 2A:
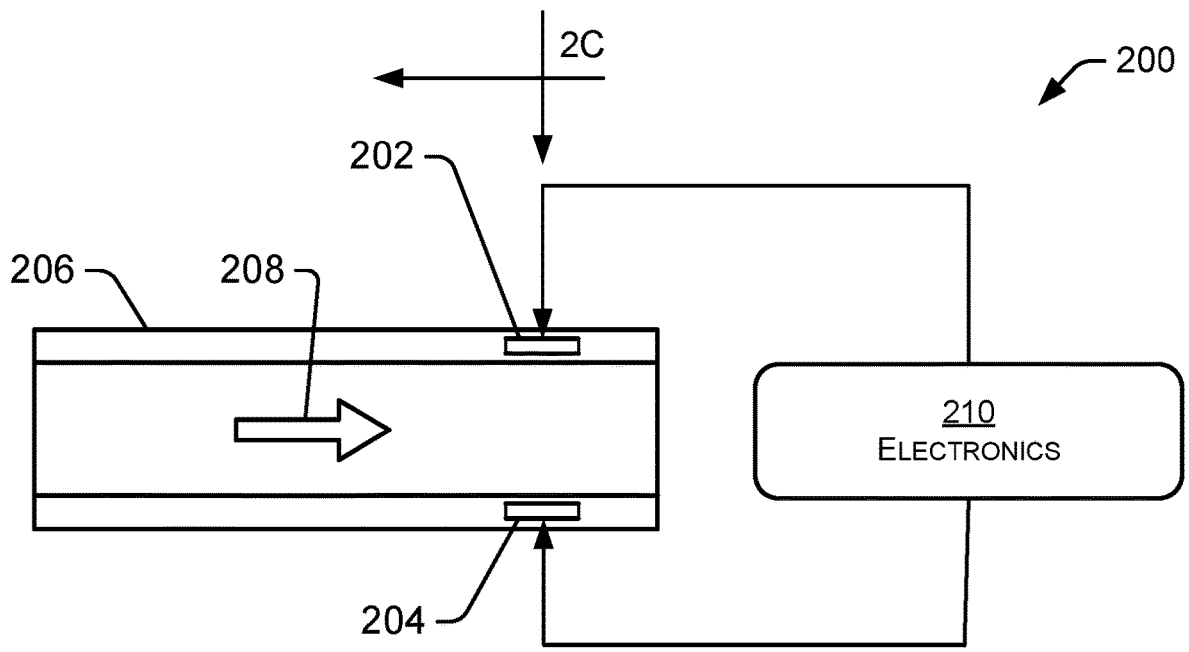
FIG. 2A shows a lengthwise cross-sectional view (taken along the direction of the flow of water) of an example capacitor assembly and shows a first version of the electronic devices utilized by the capacitor assembly.

FIG. 2A shows a lengthwise cross-sectional view of example capacitor assembly 200 having electrodes 202, 204. A conduit or pipe 206 is configured to contain a waterflow 208 within a water meter. The electrodes 202, 204 may be mounted within the conduit 206, which may be formed of plastic, an electrically insulating material, or other material (s) depending on design requirements. In the example shown, the electrodes 202, 204 are arranged in a face-to-face manner.

In the example of FIG. 2A, the capacitor assembly includes electronics 210 which may provide an input signal and output measurement capabilities. The electronics 210 may be used to determine at least part of a complex admittance of the capacitor assembly, i.e., at least one of the real value and the imaginary value of the complex admittance. The electronics 210 may be configured in different manners, depending on design requirements, costs, etc.

Figure 2B:
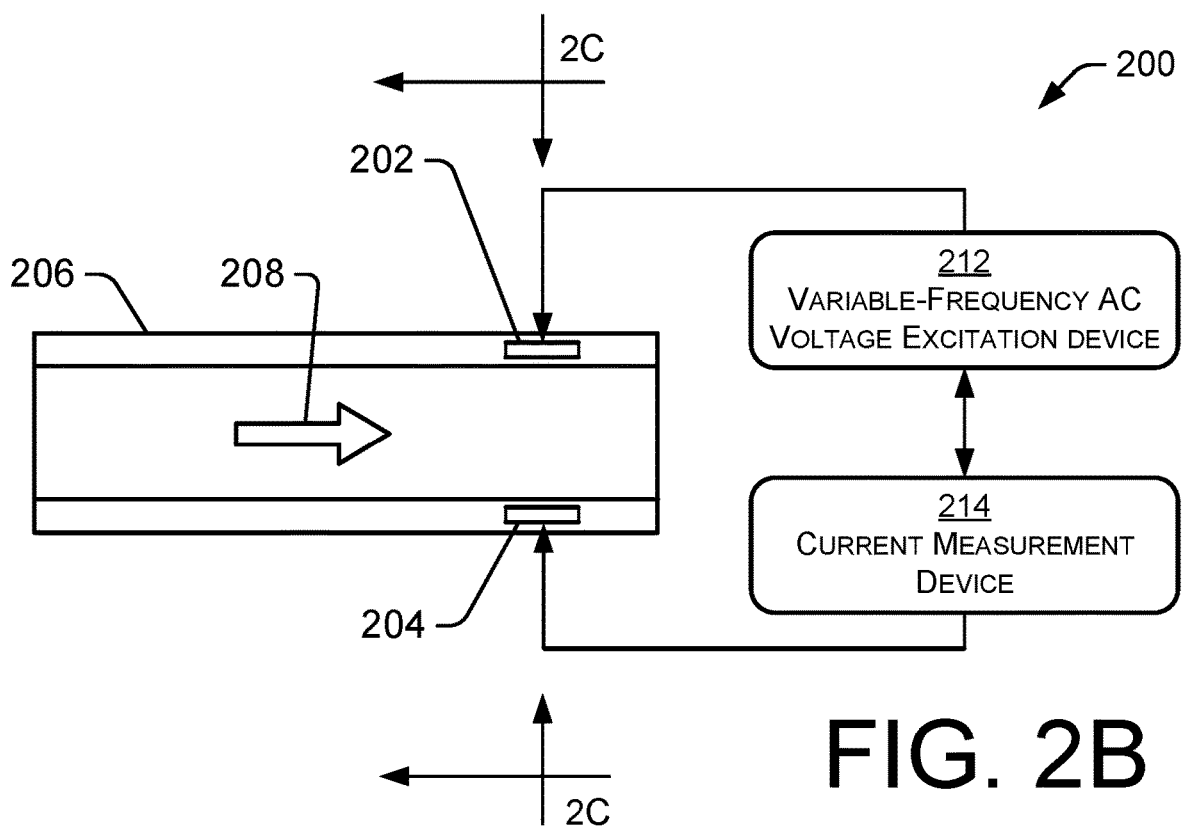
FIG. 2B shows a second version of the electronic devices utilized by the capacitor assembly.
Figure 2C:
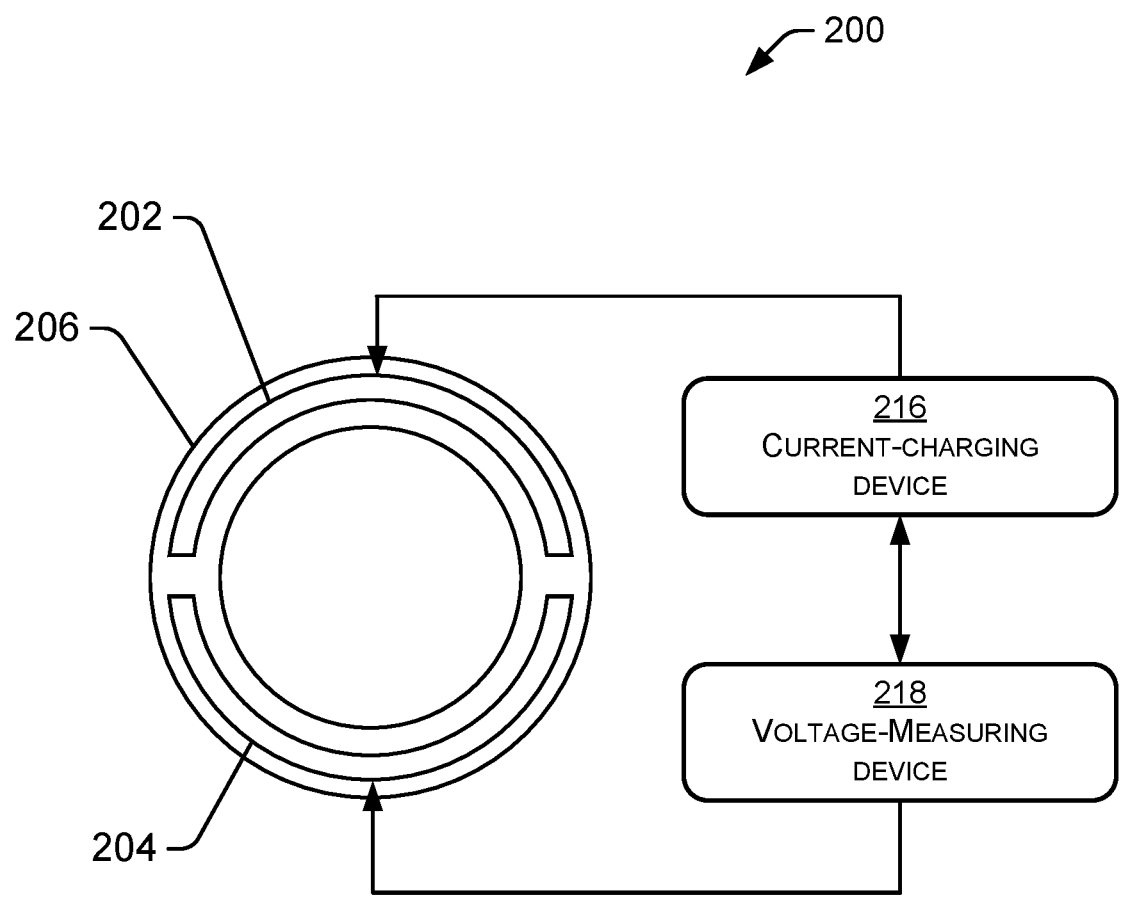
FIG. 2C shows a cross-sectional view (taken perpendicular to the flow of water) of the electrodes of FIG. 2A and shows a third version of the electronic devices utilized by the capacitor assembly.

Example electronic designs are shown and described in FIGS. 2B and 2C, and variations thereof.

FIG. 2B shows a variation of electronics 210 of FIG. 2A. In the example of FIG. 2B, a variable-frequency AC voltage excitation device 212 is used to input a signal to the capacitor assembly. A current-measuring device 214 is used to measure current flow resulting from one or more frequencies used in input signals. The variable-frequency AC voltage excitation device 212 and the current measurement device 214 are both connected to both electrodes 202, 204. In some implementations, the devices 212, 214 may be connected to each other, such as to exchange signal information, timing information, etc. Accordingly, in a first method to determine at least part of the complex admittance, the electronics of the capacitor assembly includes the variable-frequency AC voltage excitation device 212. At different input frequencies, different current levels pass through the capacitor assembly. The current passing through the capacitor assembly is measured by a current measurement device (e.g., a meter) 214, which may also be part of the electronics of the capacitor assembly.

FIG. 2C shows the electrodes 202, 204 of FIGS. 2A and 2B in a cross-sectional view perpendicular to the conduit. In the example shown, each electrode wraps around approximately 170 degrees of the pipe 206, and collectively, the two electrodes wrap around approximately 340 or 350 degrees of the pipe. In an alternative example, each electrode wraps around between approximately 10 to 170 degrees of the pipe 206. And further, in different embodiments based on different design requirements, each electrode 202, 204 may wrap around different portions of the pipe 206.

FIG. 2C shows a further variation of electronics 210 of the capacitor assembly used to determine at least part of the complex admittance of the capacitor assembly. In the example shown, a current-charging device 216 is used to charge the electrodes of the capacitor assembly. A voltage-measuring device 218 is used to measure voltage-change over time, after the capacitor is charged. The current-charging device 216 and the voltage-measuring device 218 may both be connected to both electrodes 202, 204. In some implementations, the devices 216, 218 may be connected to each other. Accordingly, FIG. 2C shows a second method to determine at least part of the complex admittance, and includes two steps. In a first step, a constant-current charge yields a value of a resistor within a model of the capacitor assembly (discussed in FIG. 5 and following flow diagrams). In a second step, voltage-decay measurement yields a value of the constant phase element (CPE) and a value of $R_b$ of the model.

FIGS. 3A through 3D show four example electrode designs suitable for arrangement with a first electrode upstream of a second electrode. This is in contrast to the electrodes 202, 204 of FIG. 2, where the electrodes are at a same point in the stream of water. FIGS. 3A through 3D show generic electronics 310, which could be configured as the variable-frequency AC voltage excitation device 212 and current measuring device 214, or configured as the current-charging device 216 and the voltage-measuring device 218, as described with respect to FIGS. 2A through 2C.

FIG. 3A shows a lengthwise cross-sectional view of example capacitor assembly 300 having electrodes 302, 304. The electrodes are mounted within plastic (or other insulating material) of a portion of a conduit or pipe 306 of a water meter configured to contain waterflow 308. In the example shown, the electronics 310 may be configured in a manner similar to that of the electronics in FIGS. 2A through 2C.

FIG. 3B shows a cross-sectional view perpendicular to the waterflow, and particularly shows an example of the electrode 302. While the electrode 302 is shown to extend approximately 180 degrees within the conduit 306, a greater or lesser span could be utilized, depending on design requirements.

FIG. 3C shows an example wherein the electrode 302 is bar-shaped (rather than curved).

FIG. 3D shows an example wherein the electrode 302 is an annulus of 360 degrees. Accordingly, while several examples are shown, the electrode design for any particular water meter may depend on design requirements of that particular model of meter.

FIG. 4 shows an example capacitor assembly 400 having a conduit 402, to which are mounted an upstream transducer 404 and a downstream transducer 406 in contact with the waterflow 408. An upstream electrode 410 and a downstream electrode 412 are integrated with the upstream transducer 404 and the downstream transducer 406, respectively. In operation, the transducers 404, 406 send signals 414, 416, respectively, which are reflected by mirrors 418, 420. Each signal is received by the non-transmitting transducer. A difference between the two times-of-flight (i.e., the two times of transmission, in the upstream versus downstream directions) is calculated to thereby determine a flowrate.

The upstream electrode 410 and the downstream electrode 412 are part of the capacitor assembly 400, and are used to determine at least part of the complex admittance of a water flow through the water meter. Based on at least part of the complex admittance, a conductivity of the waterflow and aspects of water quality can be determined.

In the examples of FIGS. 2 through 4, the capacitor assemblies include two electrodes or "plates." In some implementations, electric and/or magnetic fields within or near the capacitor assembly may result in some interference in the operation of the capacitor assembly and/or a device within which the capacitor assembly is installed. In an example to counteract such fields, "compound" electrode(s) may be used to replace one or both of the two electrodes in a capacitor assembly. A compound electrode may include one or more additional conductive elements (or electrodes). The additional conductive elements may be shaped, oriented, and/or positioned to shield and/or minimize the detrimental electric coupling of the capacitor assembly with electric or magnetic fields and/or electromagnetic radiation of the environment of the capacitor assembly. The additional conductive element(s) may be connected to respective electrode(s) of the capacitor assembly, or may be connected to a common ground or grounding voltage.

FIG. 5 shows a diagram of a circuit 500 that forms the basis of an example model to be used in a process to determine at least part of the complex admittance of a capacitor or capacitor assembly (e.g., the capacitor assembly 200 of FIG. 2A having electrodes 202, 204). The model may also be used to determine water conductivity and aspects of the water quality of water flowing through the water meter. In the example, the model may include the circuit 500 and may include one or more applications 128 having one or more algorithms, component values associated with an initial calibration of the circuit 500, etc.

In the example of FIG. 5, the circuit 500 has inputs 502, 504. A first portion of the circuit 500 includes an inductor 506 having value $L_c$, a resistor 508 having value $R_c$, and a capacitor 510 having value $C_c$. The values of these components comprise an initial calibration of the circuit 500, and are selected based on the geometry of the water meter and conduit, materials, waterflow rates, etc., of a particular water meter. A second portion 512 of the circuit 500 is configured to model the plastic wall of the conduit through which water flow and the water itself. The plastic wall is important, in part, because the electrodes of the capacitor (e.g., see FIGS. 2A through 3D) are embedded in the plastic. Aspects of a constant phase element (CPE) 514 may be represented by two parameters, $Q_0$ and alpha. For example, the CPE may be expressed as Ycpe=Qo*(i*2*pi*frequency)^alpha. A resistor 516 having resistance of $R_b$ and a capacitor 518 having capacitance $C_b$ are configured in parallel. In the example shown, the components withing the circuit 512 are used to model characteristics of the capacitor assembly.

Example operation of the model 126, based on the circuit diagram 500 and an application 128 and associated algorithms, may be understood. Referring to FIG. 2, the capacitor assembly 200 may be stimulated by an input, such as variable-frequency AC voltage-excitation device 210. An output may be measured, such as by current-measurement device 214. Paired input (voltage frequency) and output (current flow) values may be used to determine the complex admittance of the capacitor assembly 200. The complex admittance may be mapped to the model 126, such as by a mathematical technique known as Inverse Problem Solving or other tools/techniques. Within the model, the value for the resistor $R_b$ may be determined. A value of water conductivity may be determined using the value of the resistor $R_b$ and at least one value of the initial calibration of the model of the capacitor assembly. Once known, water conductivity may be used to learn about water quality, such as pollutants, impurities, etc.

Example Methods

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory 120 may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media.

Figure 6:
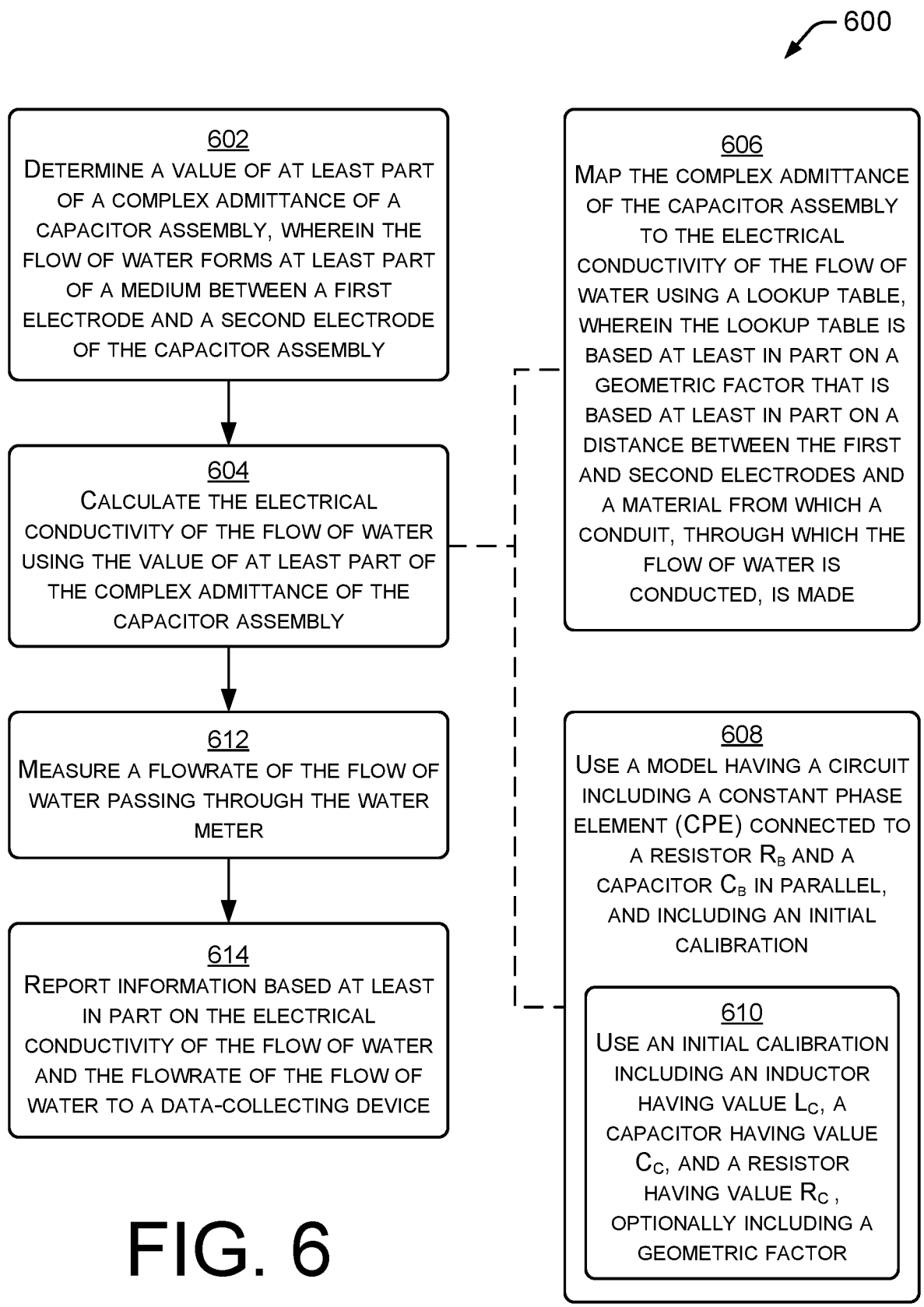
FIG. 6 is a flow diagram showing techniques to determine a conductivity of water flowing through a water meter.

FIG. 6 shows a method 600 by which the conductivity of water flowing through the water meter may be determined. In an example, at least part of the complex admittance of the capacitor assembly (e.g., one of the capacitor assemblies described with respect to FIGS. 2 through 4) is determined.

In the example, the real value, the complex value, or both may be determined. The determined value may be used to determine a value of the conductivity of water flowing through the water meter. In some examples, a model of the capacitor assembly is used to calculate the conductivity of the water. A flowrate and/or quantity of water flowing through the water meter may be measured. The value of the conductivity of the water (or data sufficient to calculate that value) and the water flowrate and/or quantity of water measured may be sent to a data collector (e.g., a utility company headend office).

At block 602, a value of at least part (e.g., a real term and/or a complex term) of a complex admittance of a capacitor assembly is determined. In an example, the flow of water forms at least part of a medium between a first electrode and a second electrode of the capacitor assembly.

At block 604, the electrical conductivity of the flow of water is calculated using the value of at least part of the complex admittance of the capacitor assembly.

Block 606 shows example and/or optional detail of block 604. In the example, the complex admittance of the capacitor assembly is mapped to—and/or associated with—the electrical conductivity of the flow of water using a lookup table. In an example, the lookup table is based at least in part on a geometric factor. The geometric factor may be based in part on the geometry (e.g., the size and shape of aspects of the water meter). In examples, the geometric factor may be based at least in part on a distance between the first and second electrodes and a material from which a conduit, through which the flow of water is conducted, is made.

At block 608 shows further example and/or optional detail of block 604. In the example, a model may be used as a tool to determine the electrical conductivity of the flow of water. In an example, the model may include a circuit having a constant phase element (CPE) connected to a resistor $R_b$ and a capacitor $C_b$ in parallel. In a further example seen at block 610, the model may have an initial calibration. The initial calibration may include an inductor having value LC, a capacitor having value CC, a resistor having value RC, and a geometrical factor. The values of the components may depend on the size, shape, materials, etc., of the water meter, the conduit through which water flows as the flowrate is measured, etc.

Various techniques may be used to map the measurement data (e.g., the complex admittance) to the model. For example, mathematical techniques known as Inverse Problem Solving may be used to estimate the values of at least part of the components of the model from the measurement data. In an example, the real and/or the complex (imaginary) part of the complex admittance (e.g., found by stimulating the capacitor assembly at different frequencies and measuring current flow at those frequencies) of the capacitor assembly (e.g., as shown in FIGS. 2 through 4) could be mapped to the model using techniques such as Inverse Problem Solving.

At block 612, a flowrate of the flow of water passing through the water meter is measured. In an example, the flowrate may be measured by upstream and downstream ultrasonic transducers.

At block 614, information based at least in part on the electrical conductivity of the flow of water and based at least in part on the flowrate of the flow of water to a data-collecting device is reported, such as to a data collector or a server at a utility company's office.

Figure 7:
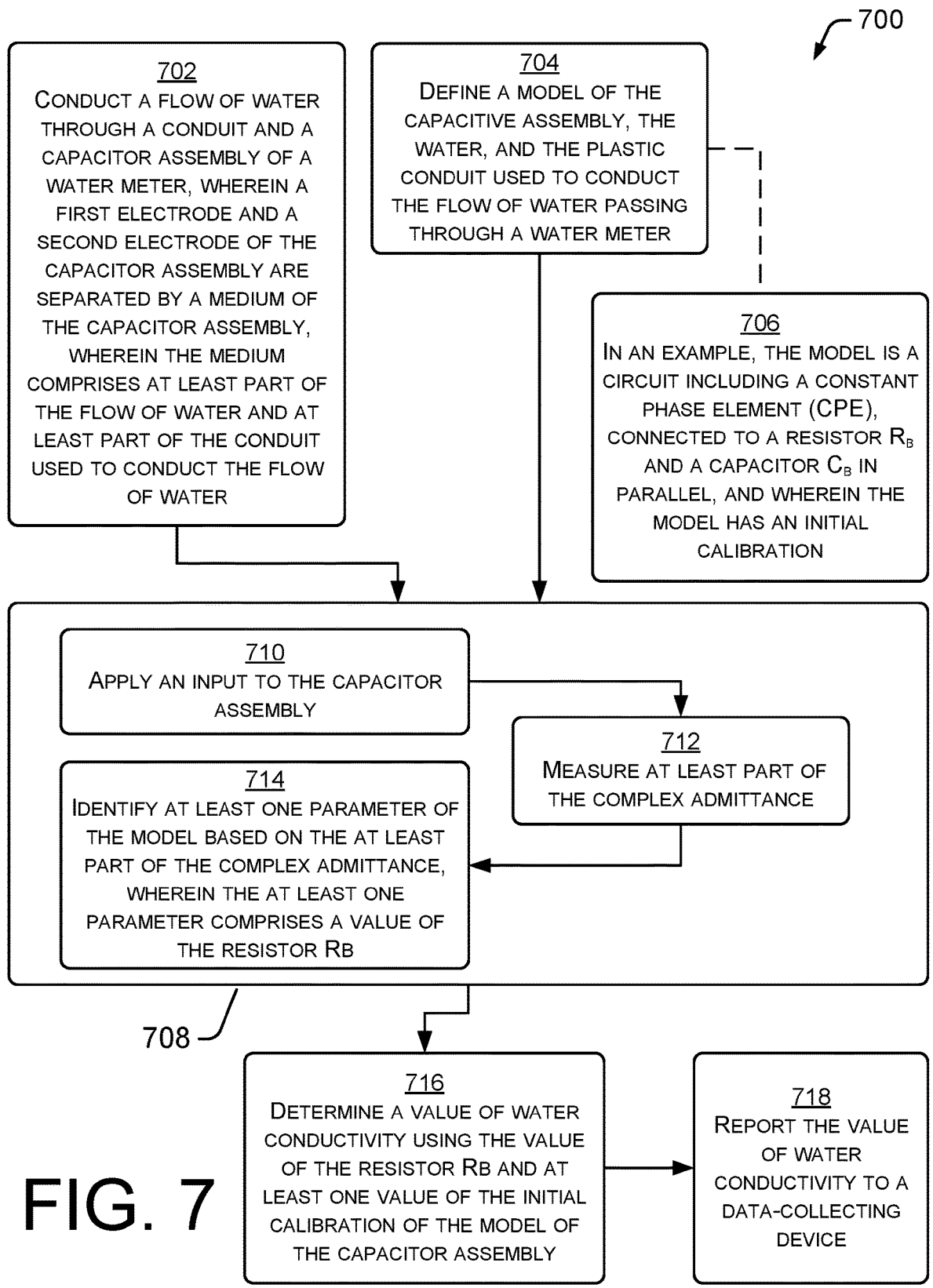
FIG. 7 is a flow diagram showing further techniques to determine the conductivity of water flowing through the water meter.
Figure 8:
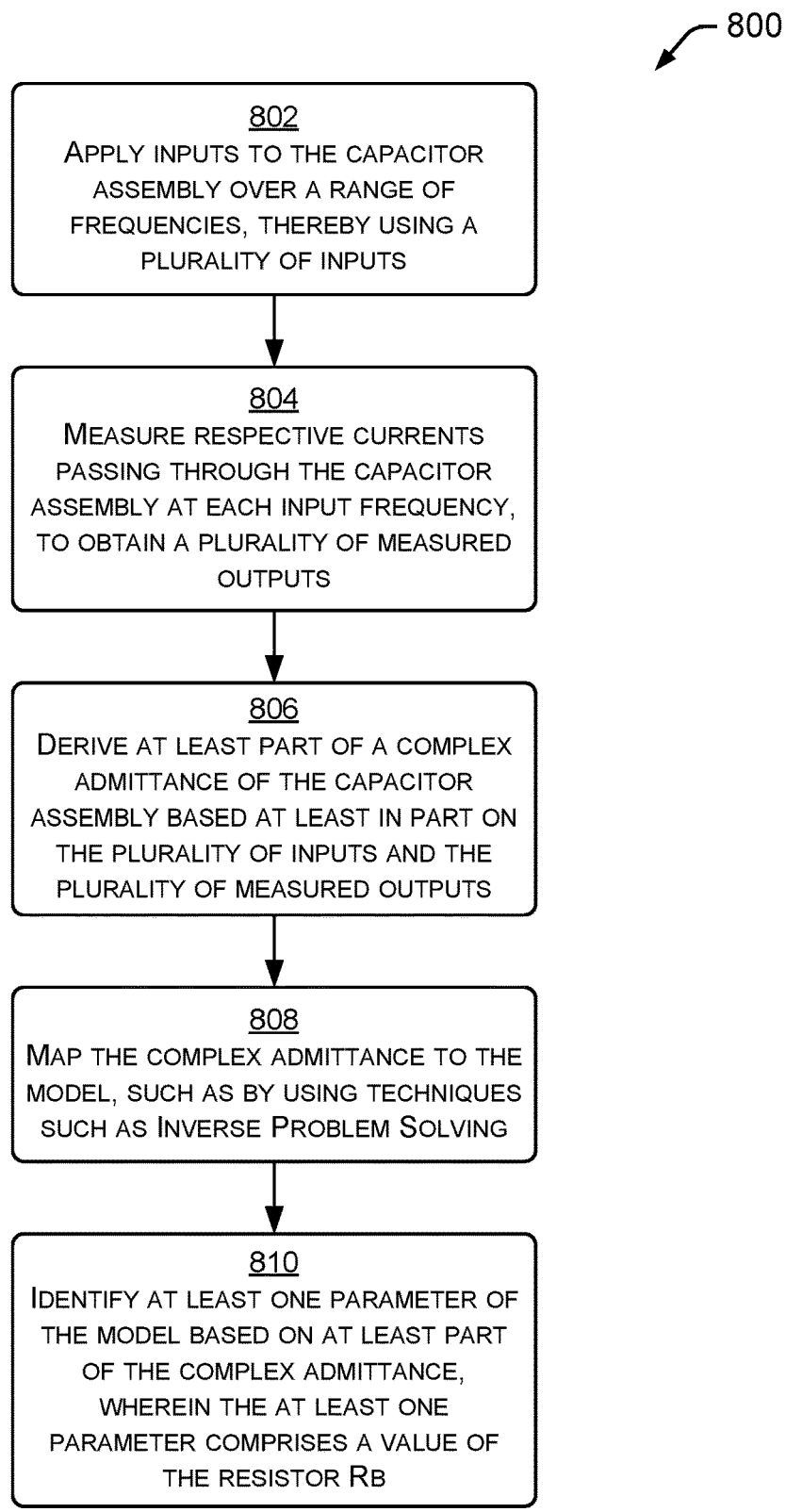
FIG. 8 is a flow diagram showing techniques comprising a first alternative to the blocks 710-714 of FIG. 7.
Figure 9:
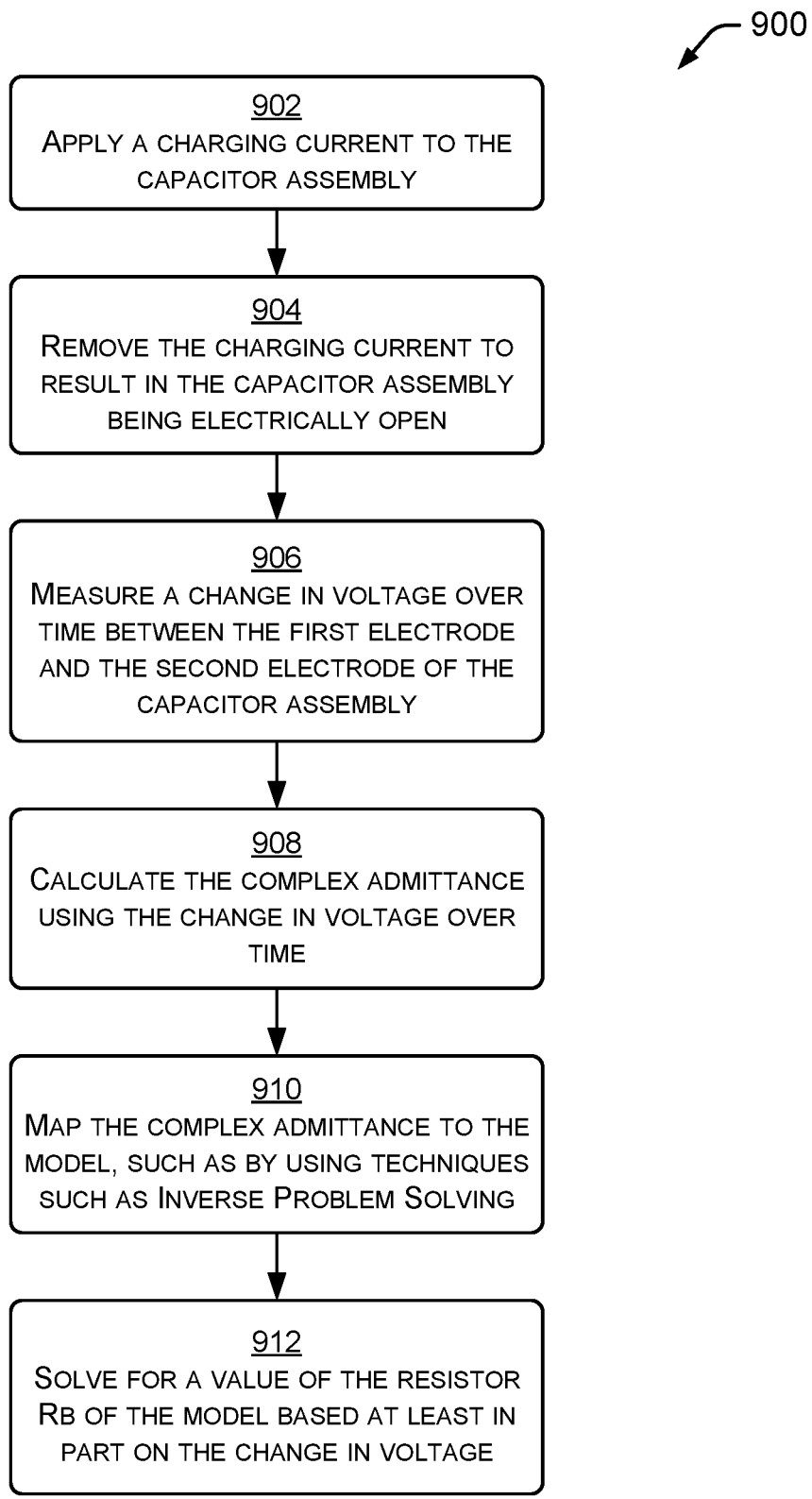
FIG. 9 is a flow diagram showing techniques comprising a second alternative to the blocks 710-714 of FIG. 7.
Figure 10:
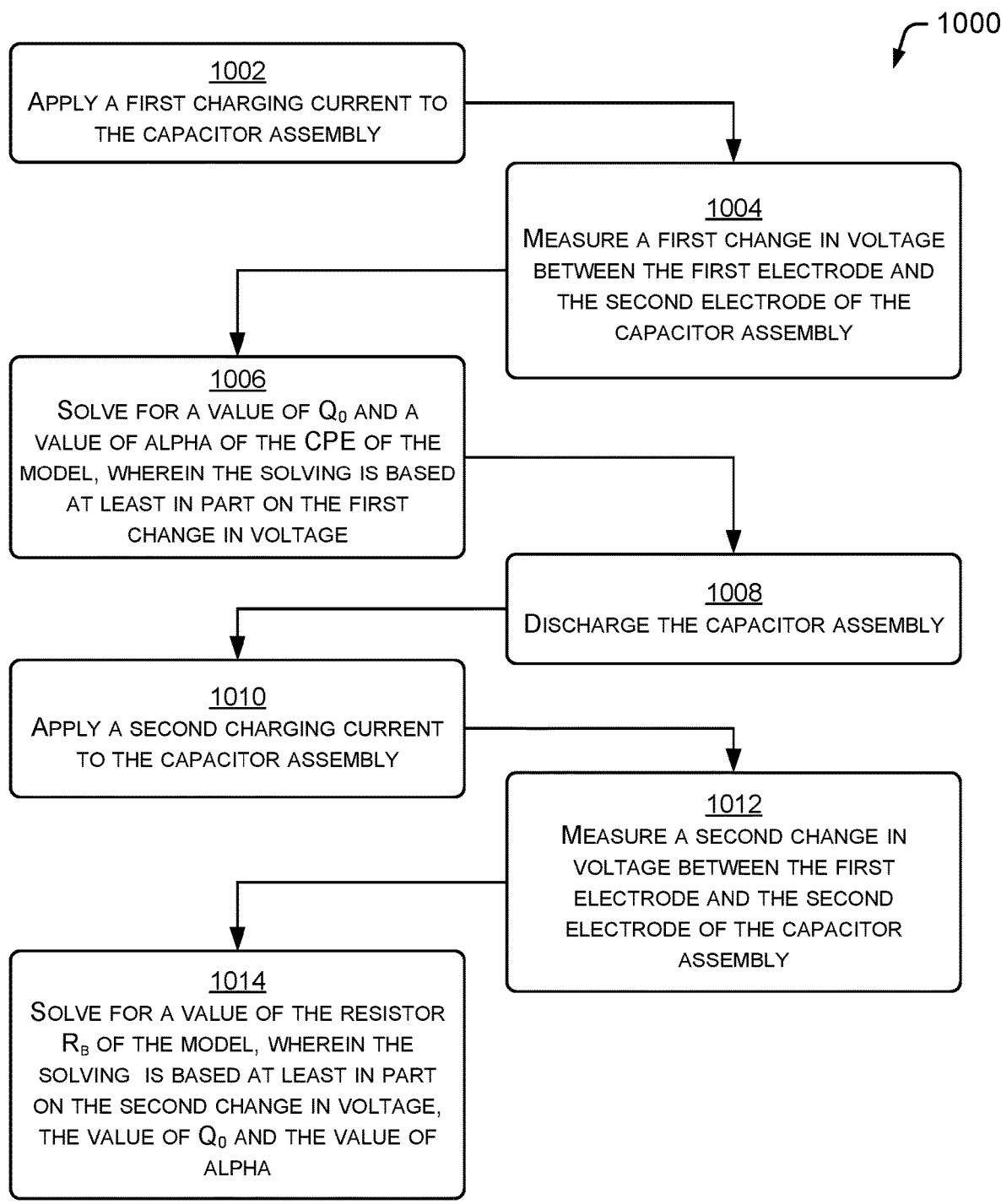
FIG. 10 is a flow diagram showing techniques comprising a third alternative to the blocks 710-714 of FIG. 7.

FIG. 7 shows an example method 700 by which the conductivity of water flowing through the water meter may be determined. The method 700 includes high-level techniques 708 including the example detail shown by blocks 710-714. FIGS. 8, 9 and 10 show three alternatives to the high-level techniques 708. Accordingly, blocks 710-714 may be replaced and/or supplemented by the methods 800, 900, and 1000, described by FIGS. 8, 9, and 10 respectively.

At block 702, a flow of water is conducted through a conduit and a capacitor assembly of a water meter. Example capacitor assemblies are seen in FIGS. 2 through 4. In the example of block 702, a first electrode and a second electrode of the capacitor assembly may be separated by a medium of the capacitor assembly. The medium may include at least part of the flow of water and at least part of the conduit used to conduct the flow of water. That is, water may flow through a portion of the conduit between or around the electrodes of the capacitor assembly. Additionally, the electrodes may be embedded in the conduit (as seen in FIGS. 2 and 3).

At block 704, a model of the capacitive assembly, the water, and the plastic conduit used to conduct the flow of water passing through the water meter is defined for use. In one example of operation, the real and/or the imaginary parts of the complex admittance of the capacitor assembly (which may be found by applying different frequencies ("input excitation") and measuring current flowing in response) could be mapped to the model using techniques such as Inverse Problem Solving.

In the example of block 706, the model is a circuit that includes a constant phase element (CPE), connected to a resistor Rb and a capacitor Cb in parallel. Additionally, the circuit of the model may have an initial calibration. The initial calibration may include values for the inductor 506, resistor 508, and capacitor 510. The initial calibration may be based at least in part on the geometry, size, shape, etc., of the conduit and other portions of the water meter.

Block 708 shows example techniques in blocks 710-714 to perform actions on the capacitor assembly and to find and/or calculate: a value of the real term; and/or a value of the imaginary term, of the complex admittance of the capacitor assembly. Using the term(s), a parameter of the model (e.g., the value of the resistor Rb) is found. Alternatively, other parameter values could be found and/or used. Methods 800, 900, and 1000 provide alternative techniques to the terms (values) of the complex admittance and parameter of the model.

At block 710, an input is applied to the capacitor assembly. The input may be an AC "excitation" signal at a known frequency, a charging current, etc.

At block 712, at least part of the complex admittance is measured. In examples, this can be the real term, the imaginary term, or both.

At block 714, at least one parameter of the model is identified, based on the at least part of the complex admittance. In an example, the at least one parameter includes a value of the resistor $R_b$.

At block 716, a value of water conductivity is determined. The determination may be made using the value of the resistor $R_b$ and at least one value of the initial calibration of the model of the capacitor assembly.

At block 718, the value of water conductivity to a data-collecting device may be reported. Alternatively, data sufficient to calculate the value of the water conductivity (e.g., including the value of $R_b$) may be reported. In an example, the report may be made to a data-collecting device, in the area of the water meter. Alternatively, the data-collecting device may be a server at a utility company's office.

FIG. 8 shows techniques 800 comprising a first alternative to the blocks 710-714 of FIG. 7.

At block 802, inputs are applied to the capacitor assembly over a range of frequencies, thereby using a plurality of inputs in sequence. In an example, each input may be a voltage excitation alternating current (AC) signal, such as variable-frequency AC voltage excitation device 212 of FIG. 2B. The device may be operated over a range of frequencies that may be selected to determine a complex admittance of the capacitor assembly.

At block 804, respective currents passing through the capacitor assembly may be measured at each input frequency, to obtain a plurality of measured current values as outputs. In an example, a current measurement device (e.g., current measurement device 214 of FIG. 2B) measures the current passing through the capacitor assembly at each of the input frequencies within the range of frequencies.

At block 806, at least part of a complex admittance of the capacitor assembly may be derived. The derivation or calculation may be based at least in part on the plurality of inputs and the plurality of measured outputs. In an example, at least part of the complex admittance is derived from the input voltage excitation and the measured current over the range of frequencies.

At block 808, the complex admittance is mapped to the model. In one example, the mapping may be performed by a technique such as Inverse Problem Solving. However, other techniques may be utilized, depending on design requirements, etc.

At block 810, at least one parameter of the model may be identified, based on at least part (e.g., the real and/or the imaginary component) of the complex admittance. In an example, the at least one parameter comprises a value of the resistor $R_b$. The value of $R_b$ is processed as seen in block 716 of FIG. 7, etc.

FIG. 8 describes a method wherein inputs are described using voltage values and the outputs are described using current values. In an alternative method—analogous or parallel to the method 800 of FIG. 8—the inputs could be described and/or measured according to current values varying at different frequencies. Similarly, in the alternative method the outputs could be described and/or measured according to voltage values. Accordingly, within this entire document, the input voltages and output currents of method 800 could be replaced by input currents and output voltages.

FIG. 9 shows techniques 900 comprising a second alternative to the blocks 710-714 of FIG. 7. At block 902, a charging current is applied to the capacitor assembly. In an example, the charging current may be applied by the current-charging device 216 of FIG. 2C. At block 904, the charging current is removed to result in the capacitor assembly being electrically open. At block 906, a change in voltage over time is measured, between the first electrode and the second electrode of the capacitor assembly. In an example, the voltage may be measured by the voltage-measuring device 218 of FIG. 2C. At block 908, at least part of the complex admittance calculated, such as by using the change in voltage over time. At block 910, at least part of the complex admittance (e.g., the value from block 908) is mapped to the model, such as by Inverse Problem Solving or other techniques. At block 912, a solution for a value of the resistance of the resistor $R_b$ of the model is found. The solution may be based at least in part on the complex admittance and/or the change in voltage over time. The value of $R_b$ is processed as seen in block 716 of FIG. 7, etc.

FIG. 10 shows techniques 1000 comprising a third alternative to the blocks 710-714 of FIG. 7. At block 1002, a first charging current is applied to the capacitor assembly. In the example of FIG. 2C, the current-charging device 216 applies a charge to the capacitor assembly. At block 1004, a first change in voltage is measured, between the first electrode and the second electrode of the capacitor assembly. In the example of FIG. 2C, the voltage-measuring device 218 measures voltages between the first and second electrodes. At block 1006, a solution for a value of $Q_0$ and a value of alpha of the CPE of the model is found. The solution for the value of the CPE may be based at least in part on the first change in voltage. At block 1008, the capacitor assembly is discharged. At block 1010, a second charging current is applied to the capacitor assembly. In the example of FIG. 2C, the current-charging device 216 applies a charge to the capacitor assembly. At block 1012, a second change in voltage is measured, between the first electrode and the second electrode of the capacitor assembly. In the example of FIG. 2C, the voltage-measuring device 218 measures voltages between the first and second electrodes. At block 1014, a solution for a value of the resistor $R_b$ of the model is found. The solution for a value of the resistor $R_b$ may be based at least in part on the second change in voltage, the value of $Q_0$ and the value of alpha (i.e., the value of $Q_0$ and alpha from block 1006). The value of $R_b$ is processed as seen in block 716 of FIG. 7, etc.

Example Systems and Devices

The following examples of a capacitive electrical conductivity sensor that is integrated within a water meter are expressed as number clauses. While the examples illustrate a number of possible configurations and techniques, they are not meant to be an exhaustive listing of the systems, methods, and/or techniques described herein.

1. A method, comprising: determining an electrical conductivity of a flow of water passing through a water meter, wherein the determining comprises: determining a value of at least part of a complex admittance of a capacitor assembly, wherein the flow of water forms at least part of a medium between a first electrode and a second electrode of the capacitor assembly; and calculating the electrical conductivity of the flow of water using inputs comprising the value of at least part of the complex admittance of the capacitor assembly; measuring a flowrate of the flow of water passing through the water meter; and reporting information based at least in part on the electrical conductivity of the flow of water and the flowrate of the flow of water to a data-collecting device.

2. The method of clause 1, wherein calculating the electrical conductivity of the flow of water comprises: mapping at least part of the complex admittance to a model of the capacitor assembly, wherein the model comprises a circuit with a constant phase element (CPE) connected to a first resistor Rb and a first capacitor Cb, wherein the first resistor Rb and the first capacitor Cb are configured in parallel, and wherein the model has an initial calibration comprising an inductor having value LC, a second capacitor having value CC, a second resistor having value RC, and a geometrical factor; and solving for a value of the first resistor Rb; wherein the inputs used to calculate the electrical conductivity of the flow of water additionally comprise the value of the first resistor Rb.

3. The method of clause 1, wherein calculating the electrical conductivity of the flow of water comprises: mapping at least part of the complex admittance of the capacitor assembly to the electrical conductivity of the flow of water using a lookup table, wherein the lookup table is based at least in part on a geometric factor that is based at least in part on a distance between the first and second electrodes and a material from which a conduit, through which the flow of water is conducted, is made.

4. The method of clause 1, wherein determining the value of at least part of the complex admittance of the capacitor assembly comprises: applying an input signal to the capacitor assembly at a plurality of frequencies; and measuring a current flow through the capacitor assembly at each of the plurality of frequencies.

5. The method of clause 1, additionally comprising one or more or all of any of the preceding clauses.

6. A method to determine a value of water conductivity, comprising: conducting a flow of water through a conduit and a capacitor assembly of a water meter, wherein a first electrode and a second electrode of the capacitor assembly are separated by a medium of the capacitor assembly, wherein the medium comprises at least part of the flow of water and at least part of the conduit used to conduct the flow of water; defining a model of the capacitor assembly, wherein the model comprises a circuit with a constant phase element (CPE) connected to a resistor Rb and a capacitor, wherein the resistor Rb and the capacitor are configured in parallel, and wherein the model has an initial calibration; applying inputs to the capacitor assembly over a range of frequencies, thereby using a plurality of inputs; measuring respective currents passing through the capacitor assembly at each input frequency, to obtain a plurality of measured outputs; deriving at least part of a complex admittance of the capacitor assembly based at least in part on the plurality of inputs and the plurality of measured outputs; identifying at least one parameter of the model based on at least part of the complex admittance, wherein the at least one parameter comprises a value of the resistor Rb; determining the value of water conductivity using the value of the resistor Rb and at least one value of the initial calibration of the model of the capacitor assembly; and reporting the value of water conductivity to a data-collecting device.

7. The method of clause 6, wherein the initial calibration of the model comprises: the value of the resistor Rb divided by a reference conductivity based at least in part on an inductor having value LC, a second capacitor having value CC, a second resistor having value RC, and a geometrical factor.

8. The method of clause 6, wherein the initial calibration of the model is based on actions comprising: passing water having a known conductivity through the water meter; applying a range of input frequencies to the first electrode and the second electrode of the capacitor assembly; and using values obtained from measurements associated with the range of input frequencies, and using the known conductivity, to identify the at least one value of the initial calibration.

9. The method of clause 6, additionally comprising one or more or all of any of the preceding clauses.

10. A method to determine water conductivity, comprising: conducting a flow of water through a conduit and a capacitor assembly of a water meter, wherein a first electrode and a second electrode of the capacitor assembly are separated by a medium of the capacitor assembly, comprising at least part of the flow of water and at least part of the conduit used to conduct the flow of water; defining a model of the capacitor assembly, wherein the model comprises a circuit with a constant phase element (CPE) connected to a resistor Rb and a capacitor, wherein the resistor Rb and the capacitor are configured in parallel; applying a charging current to the capacitor assembly; removing the charging current to result in the capacitor assembly being electrically open; measuring a change in voltage over time between the first electrode and the second electrode of the capacitor assembly; calculating at least part of a complex admittance, based at least on the change in voltage over time; mapping at least part of the complex admittance to the model; solving for a value of a resistance of the resistor Rb of the model based at least in part on the at least part of the complex admittance; and reporting data based at least in part on the value of the resistance of the resistor Rb to a data-collecting device.

11. The method of clause 10, wherein mapping the at least part of complex admittance comprises: mapping the complex admittance using inverse problem solving.

12. The method of clause 10, additionally comprising: determining a value of water conductivity using the value of the resistor Rb and at least one value of an initial calibration of the model comprising, the value of the resistor Rb divided by a reference conductivity based at least in part on an inductor having value LC, a second capacitor having value CC, a second resistor having value RC, and a geometrical factor.

13. The method of clause 10, additionally comprising one or more or all of any of the preceding clauses.

14. A method to determine water conductivity, comprising: conducting a flow of water through a conduit and a capacitor assembly of a water meter, wherein a first electrode and a second electrode of the capacitor assembly are separated by a medium of the capacitor assembly, comprising at least part of the flow of water and at least part of the conduit used to conduct the flow of water; defining a model of the capacitor assembly, wherein the model comprises a circuit with a constant phase element (CPE) connected to a resistor Rb and a capacitor, wherein the resistor Rb and the capacitor are configured in parallel; applying a first charging current to the capacitor assembly; measuring a first change in voltage between the first electrode and the second electrode of the capacitor assembly; solving for a value of Q0 and a value of alpha of the CPE of the model, wherein the solving is based at least in part on the first change in voltage; discharging the capacitor assembly; applying a second charging current to the capacitor assembly; measuring a second change in voltage between the first electrode and the second electrode of the capacitor assembly; solving for a value of the resistor Rb of the model, wherein the solving is based at least in part on the second change in voltage, the value of Q0 and the value of alpha; and reporting data based at least in part on the value of the resistor Rb to a data-collecting device.

15. The method of clause 14, additionally comprising: determining the value of water conductivity using the value of the resistor Rb and the values of Q0 and alpha.

16. The method of clause 14, wherein applying the first charging current and applying the second charging current comprises: applying two different charges to the capacitor assembly.

17. The method of clause 14, additionally comprising one or more or all of any of the preceding clauses.

18. A water meter, comprising: a conduit to conduct a flow of water; an upstream transducer, attached to an upstream location in the conduit, to send a downstream-directed acoustic signal and to receive an upstream-directed acoustic signal; a downstream transducer, attached to a downstream location in the conduit, to send the upstream-directed acoustic signal and to receive the downstream-directed acoustic signal; a processor to compare a first time-of-flight of the downstream-directed acoustic signal to a second time-of-flight of the upstream-directed acoustic signal and to determine a flowrate of the flow of water; a capacitor assembly to measure at least part of a complex admittance using a first electrode and a second electrode, wherein the first electrode and the second electrode are separated by a medium of the capacitor assembly, comprising at least part of the flow of water and at least part of the conduit used to conduct the flow of water; a system to determine an electrical conductivity of the flow of water based at least in part on the complex admittance; and a communications device to transmit information based at least in part on the electrical conductivity of the flow of water within the flow of water and based at least in part on the flowrate of the flow of water.

19. The water meter of clause 18, additionally comprising: a model, usable by the system as the system determines the electrical conductivity of the flow of water, wherein an initial calibration of the model is based on actions comprising: passing water having a known conductivity through the water meter; applying a range of input frequencies to the first electrode and the second electrode of the capacitor assembly; and using values obtained from measurements associated with the range of input frequencies, and using the known conductivity, to identify at least one value of the initial calibration.

20. The water meter of clause 18, wherein: the upstream transducer comprises the first electrode of the capacitor assembly; and the downstream transducer comprises the second electrode of the capacitor assembly.

21. The water meter of clause 18, wherein: the first electrode and the second electrode of the capacitor assembly are positioned in-line within the conduit, wherein the first electrode is upstream from the second electrode.

22. The water meter of clause 18, wherein the capacitor assembly comprises: the first electrode and the second electrode of the capacitor assembly are positioned in a face-to-face relationship on opposed sides the conduit.

23. The water meter of clause 18, wherein the system to determine the electrical conductivity of the flow of water comprises: a lookup table that maps the complex admittance of the capacitor assembly to the electrical conductivity of the flow of water.

24. The water meter of clause 18, additionally comprising: a lookup table, defined in a memory device in communication with the processor, to map the complex admittance of the capacitor assembly to the electrical conductivity of the flow of water based at least in part on a geometric factor that is based at least in part on a distance between the first and second electrodes and a material from which the conduit is made.

25. The water meter of clause 18, additionally comprising one or more or all of any of the preceding clauses.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The words comprise, comprises, and/or comprising, when used in this specification and/or claims specify the presence of stated features, devices, techniques, and/or components. The words do not preclude the presence or addition of one or more other features, devices, techniques, and/or components and/or groups thereof.

What is claimed is:

1. A method of determining an electrical conductivity of a flow of water passing through a water meter, wherein the method comprises:
    determining a value of at least part of a complex admittance of a capacitor assembly, wherein the flow of water forms at least part of a medium between a first electrode and a second electrode of the capacitor assembly;
    calculating the electrical conductivity of the flow of water using inputs comprising the value of at least part of the complex admittance of the capacitor assembly, wherein calculating the electrical conductivity of the flow of water comprises:
        mapping at least part of the complex admittance to a model of the capacitor assembly, wherein the model comprises a circuit with a constant phase element (CPE) connected to a first resistor $R_b$ and a first capacitor $C_b$, wherein the first resistor $R_b$ and the first capacitor $C_b$ are configured in parallel, and wherein the model has an initial calibration comprising an inductor having value LC, a second capacitor having value CC, a second resistor having value RC, and a geometrical factor; and
        solving for a value of the first resistor $R_b$;
    wherein the inputs used to calculate the electrical conductivity of the flow of water additionally comprise the value of the first resistor $R_b$;
    measuring a flowrate of the flow of water passing through the water meter; and
    reporting information based at least in part on the electrical conductivity of the flow of water and the flowrate of the flow of water to a data-collecting device.

2. The method of claim 1, wherein determining the value of at least part of the complex admittance of the capacitor assembly comprises:
    applying an input signal to the capacitor assembly at a plurality of frequencies; and
    measuring a current flow through the capacitor assembly at each of the plurality of frequencies.

3. A method to determine a value of water conductivity, comprising:
    conducting a flow of water through a conduit and a capacitor assembly of a water meter, wherein a first electrode and a second electrode of the capacitor assembly are separated by a medium of the capacitor assembly, wherein the medium comprises at least part of the flow of water and at least part of the conduit used to conduct the flow of water;
    defining a model of the capacitor assembly, wherein the model comprises a circuit with a constant phase element (CPE) connected to a resistor $R_b$ and a capacitor, wherein the resistor $R_b$ and the capacitor are configured in parallel, and wherein the model has an initial calibration;

applying inputs to the capacitor assembly over a range of frequencies, thereby using a plurality of inputs;

measuring respective currents passing through the capacitor assembly at each input frequency, to obtain a plurality of measured outputs;

deriving at least part of a complex admittance of the capacitor assembly based at least in part on the plurality of inputs and the plurality of measured outputs;

identifying at least one parameter of the model based on at least part of the complex admittance, wherein the at least one parameter comprises a value of the resistor $R_b$;

determining the value of water conductivity using the value of the resistor $R_b$ and at least one value of the initial calibration of the model of the capacitor assembly; and reporting the value of water conductivity to a data-collecting device.

4. The method of claim 3, wherein the initial calibration of the model comprises:

the value of the resistor $R_b$ divided by a reference conductivity based at least in part on an inductor having value LC, a second capacitor having value CC, a second resistor having value RC, and a geometrical factor.

5. The method of claim 3, wherein the initial calibration of the model is based on actions comprising:

passing water having a known conductivity through the water meter;

applying a range of input frequencies to the first electrode and the second electrode of the capacitor assembly; and using values obtained from measurements associated with the range of input frequencies, and using the known conductivity, to identify the at least one value of the initial calibration.

6. A water meter, comprising:

a conduit to conduct a flow of water;

an upstream transducer, attached to an upstream location in the conduit, to send a downstream-directed acoustic signal and to receive an upstream-directed acoustic signal;

a downstream transducer, attached to a downstream location in the conduit, to send the upstream-directed acoustic signal and to receive the downstream-directed acoustic signal; and a processor to compare a first time-of-flight of the downstream-directed acoustic signal to a second time-of-flight of the upstream-directed acoustic signal and to determine a flowrate of the flow of water, wherein the processor additionally performs actions comprising:

determining a value of at least part of a complex admittance of a capacitor assembly, wherein the flow of water forms at least part of a medium between a first electrode and a second electrode of the capacitor assembly;

calculating an electrical conductivity of the flow of water using inputs comprising the value of at least part of the complex admittance of the capacitor assembly, wherein calculating the electrical conductivity of the flow of water comprises:

mapping at least part of the complex admittance to a model of the capacitor assembly, wherein the model comprises a circuit with a constant phase element (CPE) connected to a first resistor $R_b$ and a first capacitor $C_b$, wherein the first resistor $R_b$ and the first capacitor $C_b$ are configured in parallel, and wherein the model has an initial calibration comprising an inductor having value LC, a second capacitor having value CC, a second resistor having value RC, and a geometrical factor; and solving for a value of the first resistor $R_b$;

wherein the inputs used to calculate the electrical conductivity of the flow of water additionally comprise the value of the first resistor $R_b$;

measuring a flowrate of the flow of water passing through the water meter; and reporting information based at least in part on the electrical conductivity of the flow of water and the flowrate of the flow of water to a data-collecting device.

7. The water meter of claim 6, additionally comprising:

a model to determine the electrical conductivity of the flow of water, wherein an initial calibration of the model is based on actions comprising:

passing water having a known conductivity through the water meter;

applying a range of input frequencies to the first electrode and the second electrode of the capacitor assembly; and using values obtained from measurements associated with the range of input frequencies, and using the known conductivity, to identify at least one value of the initial calibration.

8. The water meter of claim 6, wherein:

the upstream transducer comprises the first electrode of the capacitor assembly; and the downstream transducer comprises the second electrode of the capacitor assembly.

9. The water meter of claim 6, wherein:

the first electrode and the second electrode of the capacitor assembly are positioned in-line within the conduit, wherein the first electrode is upstream from the second electrode.

10. The water meter of claim 6, wherein:

the first electrode and the second electrode of the capacitor assembly are positioned in a face-to-face relationship on opposed sides the conduit.

11. The water meter of claim 6, additionally comprising:

a lookup table to map the complex admittance of the capacitor assembly to the electrical conductivity of the flow of water.

12. The water meter of claim 6, additionally comprising:

a lookup table, defined in a memory device in communication with the processor, to map the complex admittance of the capacitor assembly to the electrical conductivity of the flow of water based at least in part on a geometric factor that is based at least in part on a distance between the first electrode and the second electrode and a material from which the conduit is made.

13. A water meter, comprising:

a conduit to conduct a flow of water;

an upstream transducer, attached to an upstream location in the conduit, to send a downstream-directed acoustic signal and to receive an upstream-directed acoustic signal;

a downstream transducer, attached to a downstream location in the conduit, to send the upstream-directed acoustic signal and to receive the downstream-directed acoustic signal;

a processor to compare a first time-of-flight of the downstream-directed acoustic signal to a second time-of-flight of the upstream-directed acoustic signal and to determine a flowrate of the flow of water, wherein calculating an electrical conductivity of the flow of water comprises:
mapping at least part of a complex admittance of a capacitor assembly to the electrical conductivity of the flow of water using a lookup table, wherein the lookup table is based at least in part on a geometric factor that is based at least in part on a distance between a first electrode and a second electrode and a material from which a conduit, through which the flow of water is conducted, is made;
measuring a flowrate of the flow of water passing through the water meter; and
reporting information based at least in part on the electrical conductivity of the flow of water and the flowrate of the flow of water to a data-collecting device.

14. The water meter of claim 13, additionally comprising:
a model to determine the electrical conductivity of the flow of water, wherein an initial calibration of the model is based on actions comprising:
passing water having a known conductivity through the water meter;
applying a range of input frequencies to the first electrode and the second electrode of the capacitor assembly; and
using values obtained from measurements associated with the range of input frequencies, and using the known conductivity, to identify at least one value of the initial calibration.

15. The water meter of claim 13, wherein:
the upstream transducer comprises the first electrode of the capacitor assembly; and
the downstream transducer comprises the second electrode of the capacitor assembly.

16. The water meter of claim 13, wherein:
the first electrode and the second electrode of the capacitor assembly are positioned in-line within the conduit, wherein the first electrode is upstream from the second electrode.

17. The water meter of claim 13, wherein the capacitor assembly comprises:
the first electrode and the second electrode of the capacitor assembly are positioned in a face-to-face relationship on opposed sides of the conduit.

18. A method, comprising:
determining an electrical conductivity of a flow of water passing through a water meter, wherein the determining comprises:
determining a value of at least part of a complex admittance of a capacitor assembly, wherein the flow of water forms at least part of a medium between a first electrode and a second electrode of the capacitor assembly; and
calculating the electrical conductivity of the flow of water using inputs comprising the value of at least part of the complex admittance of the capacitor assembly, wherein calculating the electrical conductivity of the flow of water comprises:
mapping at least part of the complex admittance of the capacitor assembly to the electrical conductivity of the flow of water using a lookup table, wherein the lookup table is based at least in part on a geometric factor that is based at least in part on a distance between the first and second electrodes and a material from which a conduit, through which the flow of water is conducted, is made;
measuring a flowrate of the flow of water passing through the water meter; and
reporting information based at least in part on the electrical conductivity of the flow of water and the flowrate of the flow of water to a data-collecting device.

19. The method of claim 18, wherein determining the value of at least part of the complex admittance of the capacitor assembly comprises:
applying an input signal to the capacitor assembly at a plurality of frequencies; and
measuring a current flow through the capacitor assembly at each of the plurality of frequencies.

* * * * *